CRYSTAL MOUNTS

Filed Feb. 27, 1946

*INVENTORS.*
ROBERT V. POUND
HAROLD F. WEBSTER
*BY* M. A. Hayes
ATTORNEY 2,791,691

CRYSTAL MOUNTS

Robert V. Pound, Cambridge, Mass., and Harold F. Webster, Ithaca, N. Y., assignors, by mesne assignments, to the United States of America as represented by the Secretary of the Navy Application February 27, 1946, Serial No. 650,696

1 Claim. (Cl. 250—31)

This invention relates to broad-band detectors, and more specifically to broad-band crystal detectors mounted in wave guides.

In practically all phases of present-day radar, frequencies in the microwave region of the radio spectrum have been adopted despite the fact that these introduce the possibility of high attenuation and radiation losses. To minimize these attendant difficulties, the frequency of incoming radar echoes is reduced as soon as possible by conventional heterodyning, and a crystal detector mounted in the R. F. line directly following the radar receiving antenna is most commonly employed for frequency mixing. For most successful operation, the crystal and its mounting structure should be matched into the R. F. line over a range of frequencies broad enough to accommodate the customary frequency discrepancies found in production transmitters and to permit the tuning thereof. The present invention is designed to perform this broad-banding function and does so by employing a reactive or a resonant impedance element inserted in the R. F. line at a predetermined distance from the crystal being matched.

A specific object of the present invention is to provide a crystal detector whose impedance is substantially constant over a wide range of frequencies.

Another object is to provide means for matching a crystal detector into a wave guide over a wide band of frequencies.

Another object is to provide crystal detector matching apparatus wherein the crystal may be inserted with either conventional or reversed polarity.

A still further object is to provide crystal detector matching apparatus which is simple both to construct and to align.

These and other objects will be apparent from the following specification which is accompanied by drawings, of which:

Figure 2:
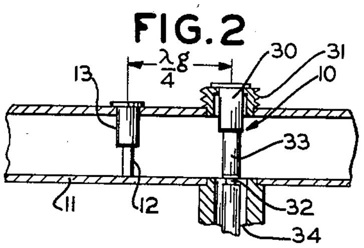
Fig. 2 is a side sectional view of the crystal detector apparatus of the present invention.
Figure 3:
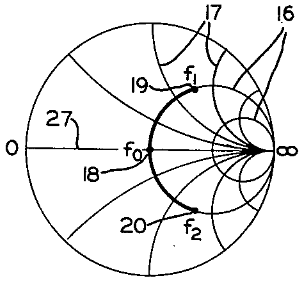
Figure 4:
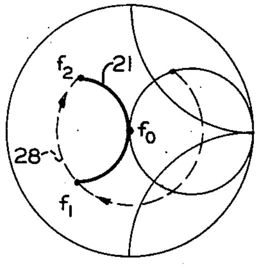
Figure 5:
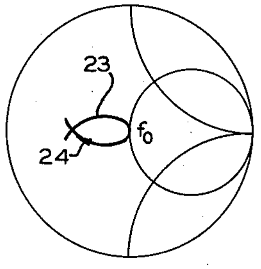
Figure 6:
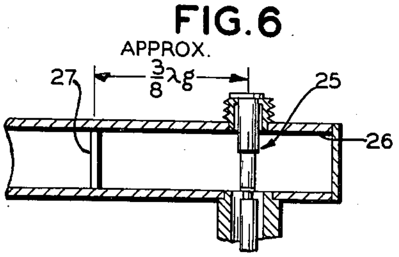
Figure 7:
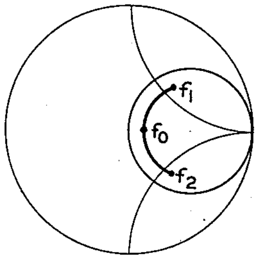
Figure 8:
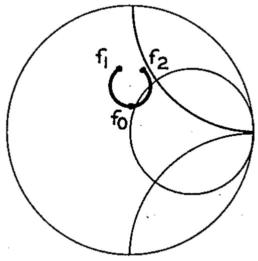
Figure 9:
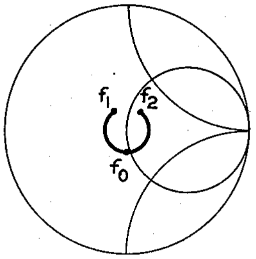

Figs. 3, 4, and 5 are impedance charts illustrating the electrical properties of the apparatus of Fig. 2;

Fig. 6 is a side view of another form of crystal detector apparatus of the present invention; and Figs. 7, 8, and 9 are impedance charts illustrating the electrical properties of the apparatus of Fig. 6.

It has been found that by properly positioning a crystal mount in a wave guide, the admittance of the crystal and mount can be matched to the characteristic admittance ($Y_c$) of the wave guide at one frequency ($f_0$) which is at the center of the frequency band over which the crystal is used. However, a broad-band match is not so attained inasmuch as the admittance of the crystal and mount acquires a capacitive susceptance at frequencies above $f_0$ and an inductive susceptance at frequencies below $f_0$ the present invention utilizes an iris placed an appropriate electrical distance from the crystal and holder to match the crystal and holder into the wave guide over a wide band of frequencies.

Figure 1:
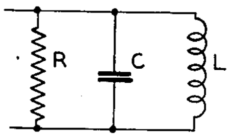
Fig. 1 is an equivalent circuit of a conventional wave guide crystal detector and mount.

In the figures and more specifically in Fig. 1 is shown the equivalent circuit of a crystal detector and mount. This circuit is one of L—C parallel resonance with a shunt damping resistance R, and is subject to the frequency sensitivity customarily experienced by a high Q resonant tank circuit.

Fig. 2 is a side sectional view of one form of the present invention with the section being taken along the longitudinal axis of the rectangular wave guide 11. A conventional crystal cartridge 10 extends across the broad walls of the wave guide 11, the large metallic end 30 of the cartridge being secured in a threaded fixture 31 integral with the guide 11 and the small metallic end 32 of the cartridge, separated from the large end 30 by a ceramic insulator 33, being connected to a coaxial line crystal output lead 34.

Figure 2A:
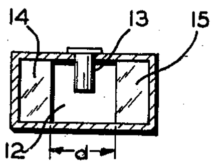
Fig. 2A is a front view of the iris employed in apparatus of Fig. 2.

A resonant iris formed by inductive window 12 and capacitive pin 13 is located in the apparatus of Fig. 2 substantially $$\frac{\lambda_g}{4}$$

from the crystal 10, $\lambda_g$ being the wave length of electromagnetic energy passing through the guide 11. Fig. 2A is a front view of the iris, showing pin 13 and window 12, the latter being formed between metallic plates 14 and 15 separated by a distance *d*.

By designing the resonant iris of Figs. 2 and 2A with the proper selectivity and placing it in the wave guide a distance $$\frac{\lambda_g}{4}$$

from the crystal, the combined iris and crystal is made to match into the wave guide over a much wider band of frequencies than does the crystal alone. The principle of the broad-banding technique of this invention is illustrated by the Smith Impedance Charts of Figs. 3, 4, and 5. In these diagrams, impedance is plotted on coordinates formed by two mutually orthogonal families of circles. In Fig. 3, for example, the horizontal diameter 27 of the chart is shown to represent values of resistance or conductance from zero at the left extremity to infinity on the right. The circles 16 tangent to one another at the infinity point are circles of constant resistance or conductance. The circles 17, however, which emanate from the infinity point are loci of either constant reactance or susceptance, with the upper half of the chart representing positive reactance or positive susceptance. Further information on these charts may be found in the article "Transmission Line Calculator" by P. H. Smith of Bell Telephone Laboratories in the January 1939 and January 1944 issues of Electronics magazine, a McGraw-Hill publication.

Referring now to the chart of Fig. 3, the admittance of the crystal circuit of Fig. 1 is indicated thereon at the center frequency $f_0$ by point 18 and at the extremities of the band of frequencies to be passed (upper frequency $f_1$ and lower frequency $f_2$) by points 19 and 20 respectively. Fig. 4 shows these admittances transferred along the dotted line 28, 90°

$$\left(\frac{\lambda_g}{4}\right)$$

back along the wave guide, and the frequency contour line 21 tends to form a closed loop, due to the frequency sensitivity of the quarter wave length section of line. By positioning at this point in the wave guide a resonant iris which in itself looks like a shunt resonant circuit with capacitive susceptance at frequencies above $f_0$ and inductive susceptance at frequencies below $f_0$, the combination of the two resonant structures results in zero susceptance at two additional frequencies other than the resonant frequency $f_0$ of the crystal itself.

By choice of the selectivity of the resonant iris, the secondary susceptance zeros may be caused to occur at any desired frequencies within a certain range of $f_0$. Thus, the resultant admittance contour 23 shown in Fig. 5 is achieved, wherein frequency increases along the contour in the direction of the arrow 24. The resultant admittance change with frequency is principally one of conductance and is considerably smaller in range than it was without the assistance of the resonant iris. The resonant iris may be formed by any number of well known structures other than the inductive window 12 and capacitive pin 13 shown in Figs. 2 and 2A.

Another broad-band crystal mount is illustrated in Fig. 6, with the conventional crystal cartridge 25 mounted in the rectangular wave guide 26 in the manner described above. An inductive iris 27 is located approximately $\frac{3}{8}$ $\lambda_g$ measured along the wave guide from the center line of the crystal mount. Iris 27 is substantially similar to the inductive window 12 of Fig. 2. Smith charts of Figs. 7, 8, and 9 illustrate the operation of this structure. The crystal mount is so designed and located that an average crystal in combination therewith has an admittance of higher than matched conductance at center frequency $f_0$ (see Fig. 7). As above, the crystal has a capacitive susceptance at frequencies above $f_0$ and an inductive susceptance at frequencies below $f_0$.

Three-eighths of a wave length back from the center line of the crystal 25, the admittance of the crystal and mount appears as shown in Fig. 8. Because of the frequency sensitivity of the three-eighths wave length line, the curve of admittance with varying frequency tends to be closed as illustrated in Fig. 8. Inductive susceptance is added by the iris 27 located at this $\frac{3}{8}$ $\lambda_g$ point of transformation, and the resultant admittance curve is lowered to the conductance axis, as shown in Fig. 9. In this figure, the resultant admittance varies much less with change in frequency than the admittance seen at the center line of the crystal without the use of the inductive iris 27. Thus, in this form of the invention, use is so made of the frequency sensitivity of the crystal and of the length of wave guide between the iris and the crystal that the resultant combination has a much more broad-band frequency characteristic than the crystal and mount alone.

Apparatus of the present invention may employ resonant or inductive structures other than those shown or described herein.

The invention described in the foregoing specification need not be limited to the details shown, which are illustrative of only one form the invention may take.

What is claimed is:

Apparatus comprising, a rectangular wave guide, a crystal rectifier so mounted in said wave guide across the broad walls thereof to present matched impedance with said wave guide at a given frequency, and a resonant iris disposed in said wave guide substantially an odd integral number of quarter wave lengths of said given frequency from said crystal, said iris being formed by two conducting members so disposed in said wave guide as to effectively narrow the broad dimension thereof and introduce an inductive reactance, and a third conducting member inserted in a broad wall of the wave guide so as to introduce a capacitive reactance, said iris and said member lying in substantially the same plane and being adjustable to match the combined impedance presented by said crystal rectifier and said resonant iris to the impedance of said wave guide at two other frequencies, one above and one below the resonant frequency of said crystal rectifier, whereby said crystal rectifier impedance is substantially matched to said wave guide impedance over a comparatively broad band of frequencies.

References Cited in the file of this patent

UNITED STATES PATENTS

| | | |
|---|---|---|
| 2,129,711 | Southworth | Sept. 13, 1938 |
| 2,396,044 | Fox | Mar. 5, 1946 |
| 2,407,069 | Fiske | Sept. 3, 1946 |
| 2,408,420 | Ginzton | Oct. 1, 1946 |
| 2,427,100 | Kihn | Sept. 9, 1947 |
| 2,432,093 | Fox | Dec. 9, 1947 |
| 2,514,678 | Southworth | July 11, 1950 |